United States Patent [19]
Wieser-Linhart

[11] Patent Number: 5,762,662
[45] Date of Patent: Jun. 9, 1998

[54] SYSTEM FOR BINDING RESIN AND TAR SUBSTANCES IN WET-CLEANING AND WET PRECIPITATION SYSTEMS

[75] Inventor: Emil Wieser-Linhart, Salzburg, Austria

[73] Assignee: BWT Aktiengesellschaft, Mondsee, Austria

[21] Appl. No.: 673,363

[22] Filed: Jun. 28, 1996

[30] Foreign Application Priority Data

Jan. 2, 1996 [AT] Austria ................................. A 6/96

[51] Int. Cl.$^6$ ................................................. B01D 47/12
[52] U.S. Cl. ................................. 55/228; 55/233; 95/211; 210/167; 210/188; 210/195.1; 210/206
[58] Field of Search ................... 95/152, 188, 189, 95/195, 228, 257.1, 211; 210/712, 718, 188, 167, 195.1, 206; 55/223, 228, 233

[56] References Cited

U.S. PATENT DOCUMENTS

| | | | |
|---|---|---|---|
| 2,090,142 | 8/1937 | Nonhebel et al. | 95/195 |
| 3,928,005 | 12/1975 | Laslo | 95/195 |
| 4,305,909 | 12/1981 | Willett et al. | 95/195 |
| 4,859,440 | 8/1989 | Zechner et al. | 423/240 |
| 5,069,795 | 12/1991 | Romey et al. | 210/652 |
| 5,514,203 | 5/1996 | Grunbacher et al. | 75/492 |
| 5,614,102 | 3/1997 | Sakurada | 210/718 |

FOREIGN PATENT DOCUMENTS

0358006B1  3/1993  European Pat. Off. .

*Primary Examiner*—Peter A. Hruskoci
*Attorney, Agent, or Firm*—Spencer & Frank

[57] ABSTRACT

A method and apparatus are provided for binding emulsified resin and tar substances in circulating water of a wet-cleaning and wet precipitation system for waste gas produced in the wood industry. Wood dust is metered into the circulating water and receives the emulsified substances adsorptively. The wood dust is removed from the water circulation path and sedimented.

2 Claims, 1 Drawing Sheet

SYSTEM FOR BINDING RESIN AND TAR SUBSTANCES IN WET-CLEANING AND WET PRECIPITATION SYSTEMS

REFERENCE OF RELATED APPLICATIONS

This application claims the right of priority of Austrian patent application No. A 6/96 filed in Austria on Jan. 2, 1996, the disclosure of which is incorporated herein by reference.

BACKGROUND OF THE INVENTION

The invention relates to a method of binding emulsified resin and tar substances in circulating water of a wet-cleaning and wet precipitation system for waste gas produced in the wood industry.

Austrian Patent AT-PS E 87227 describes a wet precipitation method for exhaust air cleaning of a timber desiccation system in which the exhaust air is wetted with circulating water, then cooled to the dew point of 50°–70° C., whereupon the condensing aerosols are ionized by means of high voltage and finally precipitated in a wet precipitator. In this case, circulating water is used for all cleaning steps, and the method is performed without waste water, because the water balance is negative due to the evaporation cooling.

If the raw, unprocessed wood (e.g. pine) contains a large amount of resin and is desiccated at high temperatures (600°–800° C.), a quantity of steam-volatile resin, tar and fatty acids is stripped out in addition to the cellular water (wood moisture). These substances are still present as gases in the desiccation waste air at 120° C. In the following cooling to the dew point of 50°–70°, these substances condense as aerosols ("blue haze") and can therefore first be precipitated as a tar-like coating on the precipitation surfaces of the wet precipitator and subsequently washed from there with circulating water.

A property of the tar-like, resinous substances, however, is that they form stable emulsions with the water and therefore cannot be precipitated, or only poorly precipitated, with the installed centrifuges for removal of solids. Hence, these substance build up in the circulating water and, consequently, severe contamination and clogging occur.

SUMMARY OF THE INVENTION

It is an object of the invention to provide a method and a system with which these tar substances described above can be adsorptively bound and precipitated out.

The above and other objects are accomplished in accordance with the invention by the provision of a method of binding emulsified resin and tar substances in circulating water of a wet-cleaning and wet precipitation system for waste gas produced in the wood industry, comprising: metering into the circulating water a wood dust which receives the emulsified substances adsorptively; removing the wood dust from the circulating water; and sedimenting the removed wood dust.

The method of the invention thus has the following features: wood dust for receiving the emulsified substances adsorptively is metered into the circulating water, and this wood dust is removed from the circulating water and sedimented.

With the aid of the invention, the formation of coatings in a wet-cleaning and wet precipitation system can be effectively prevented. In a preferred embodiment of the invention, a quantity of wood dust amounting to 100% to 800% of the original waste gas dust proportion is added to the waste gas. Advantageously, the wood dust is metered into the waste gas supplied to the wet-cleaning and wet precipitation system. In accordance with a further feature of the invention, sediment which is formed can either be recirculated in a desiccator or burnt in a furnace with other wood waste products.

Wood dust produced in large quantities in the particle board industry has proven to be the optimum substance for performing the method of the invention. This dust is produced during surface smoothing in grinding machines. Wood sanding dust possesses good properties for the purposes of the invention, because it has a good affinity for resin and because tar, and it darkens. The sanding dust also has a corresponding fineness and therefore a large surface area. Moreover, the loaded, wetted sanding dust sediments well.

In accordance with a further aspect of the invention, the residual product can be disposed of, in the form of drained sediment, either by burning, or composting. It has proven particularly advantageous to use a substance which corresponds to the natural raw material wood.

In a comparison of methods and systems currently in use, it has been seen that some systems operate problem-free without coating buildup, while others tend toward excessive baking-on. In an analysis of operating conditions, a link has been found between the type of wood and the system-stipulated dust content present in the waste gas following cyclone separations. Systems that have a high dust content and a low resin content are always free from coating buildup. With the addition of wood dust according to the invention, it has been determined that no worsening of the dust content of the clean gas occurs, and the quality of the circulating water is significantly improved. Therefore, the metering of wood dust into the circulating water permits universal application of the wet precipitation method in the timber industry.

Within the scope of the method according to the invention, the sanding dust can be supplied into the gas line, into the washer, directly into the circulating water or into the circulating water line of the sludge removal device. A system according to the invention for performing the method includes a washing container to which the waste gas to be cleaned is supplied via a gas line at the lower end, and which has a washing device and a wet precipitation arrangement downstream thereof in the direction of gas flow. A wood dust supply device associated with the container has a supply and a metering device, by means of which a metered quantity of wood dust can be introduced into the circulating water. A sludge removal device is connected to the lower end of the container.

The wood dust supply device preferably discharges into the wetting device of the waste gas supply line via an injection device. In accordance with another feature of the invention, the sludge removal device has a sludge pump and a decantering centrifuge downstream thereof, which is connected to the container by way of a water line.

The invention is described in detail below by way of an embodiment of a wet-cleaning and wet precipitation system and in conjunction with the accompanying drawing.

DETAILED DESCRIPTION OF THE PREFERRED EMBODIMENT

Figure 1:
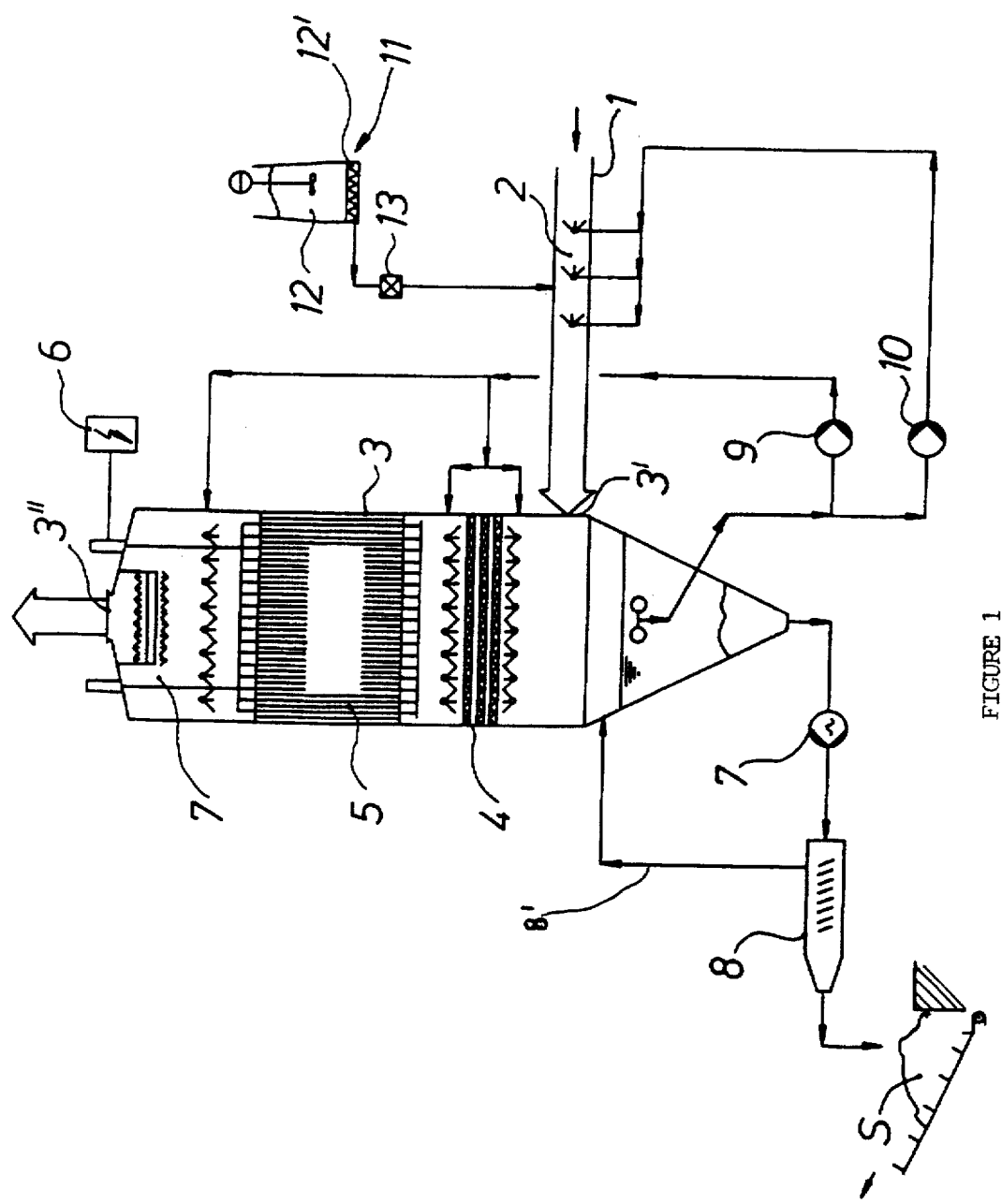
FIG. 1 is a schematic showing a system, according to the invention, for binding emulsified resin and tar substances in circulating water of a wet-cleaning and wet precipitation system for waste gas produced the wood industry.

Referring to FIG. 1, there is shown a waste gas line 1 for supplying waste gas or exhaust air of a wood desiccation system (not shown) to a lower end of a vertical container 3 of a wet-cleaning and wet precipitation system. A pre-wetting device 2 is disposed in the waste gas line. The supplied waste gas or exhaust air is introduced to container 3 through an inlet 3'. The gas flows upwardly in container 3 through a washing device 4 and is cooled in the process to the dew point of 60°–70° C. In a wet precipitation means arrangement which, as shown in the figure, may include a honeycomb-shaped device 5 disposed downstream in the direction of gas flow, to which an electrical high voltage is applied by a highvoltage unit 6, condensing aerosols in the gas are ionized and precipitated out in a wet precipitator 7 or de-mister disposed downstream of honeycomb-shaped wet precipitation means 5. The gas exits the upper end of the column 3 as clean gas through an outlet 3".

The residue formed in container 3 is removed as sludge by a sludge pump 7 and a decantering centrifuge 8 connected to container 3 by a water line 8'. The residue is then deposited as sediment S. In a circulation path, the washing water is conveyed by a circulation pump 9 up to the washer and for rinsing the honeycomb, on the one hand and, on the other hand, to the pre-wetting device 2 by a pre-wetting pump 10.

A wood dust supply device 11 is provided in a region of waste gas line 1 and includes a wood dust silo 12 which has a screw-conveyor 12' and a ventilator 13 which sprays the wood dust, preferably wood sanding dust, into pre-wetting device 2.

The wood dust blown into the pre-wetted waste gas is introduced into container 3 with the waste gas, and enters the washing water circulation path in this way. The metering in of the wood dust can be controlled by the silo discharge screw-conveyor 12' to correspond to operating requirements. A quantity of wood dust amounting to 100% to 800% of the original waste gas dust proportion is added to the waste gas.

The described embodiment can be modified within the scope of the general concept underlying the invention. Thus, the wood dust can be added directly into the container, the washing water circulation path or the circulating water line of the sludge removal device instead of into the crude gas.

What is claimed is:

1. A system for binding emulsified resin and tar substances in circulating water of a wet-cleaning and wet precipitation system for waste gas produced in the wood industry, comprising:

a washing container having a lower end to which the waste gas to be cleaned is supplied via a waste gas supply line, the washing container including a washing device and a wet precipitation means downstream of the washing device in a direction of gas flow;

a wood dust supply device for containing a supply of wood dust;

a metering device for metering a quantity of wood dust from the wood dust supply device into the circulating water;

a sludge removal device connected to the lower end of the washing container for removing sludge from the washing container that is formed when wood dust is metered into the circulating water; and a wetting device for pre-wetting the waste gas in the waste gas supply line, wherein the metering device includes an injection device coupled to the wood dust supply device for discharging the wood dust into the wetting device.

2. The system as defined in claim 1, wherein the sludge removal device includes a sludge pump; a decantering centrifuge disposed downstream of the sludge pump; and a water line connected between the decantering centrifuge and the container.

* * * * *